United States Patent
Dalton et al.

(10) Patent No.: US 11,460,835 B2
(45) Date of Patent: Oct. 4, 2022

(54) BOP CONTROL SYSTEMS AND RELATED METHODS

(71) Applicant: Transocean Innovation Labs Ltd., Grand Cayman (KY)

(72) Inventors: John Matthew Dalton, Missouri City, TX (US); Luis Pereira, Katy, TX (US)

(73) Assignee: TRANSOCEAN INNOVATION LABS LTD., Grand Cayman (KY)

( * ) Notice: Subject to any disclaimer, the term of this patent is extended or adjusted under 35 U.S.C. 154(b) by 0 days.

(21) Appl. No.: 16/165,545

(22) Filed: Oct. 19, 2018

(65) Prior Publication Data

US 2019/0278260 A1 Sep. 12, 2019

Related U.S. Application Data

(63) Continuation of application No. 15/043,977, filed on Feb. 15, 2016, now abandoned.

(Continued)

(51) Int. Cl.

| | | |
|---|---|---|
| *G05B 23/02* | (2006.01) | |
| *E21B 34/16* | (2006.01) | |
| *G05B 9/03* | (2006.01) | |

(52) U.S. Cl.
CPC .......... *G05B 23/0283* (2013.01); *E21B 34/16* (2013.01); *G05B 9/03* (2013.01)

(58) Field of Classification Search
CPC ........ G05B 23/0283; G05B 9/03; E21B 34/16
See application file for complete search history.

(56) References Cited

U.S. PATENT DOCUMENTS

| | | | |
|---|---|---|---|
| 2004/0217654 A1* | 11/2004 | Maturana | ................ G05B 9/03 |
| | | | 307/116 |
| 2005/0132877 A1 | 6/2005 | Hart | |

(Continued)

FOREIGN PATENT DOCUMENTS

| | | |
|---|---|---|
| CN | 101036330 A | 9/2007 |
| CN | 103033696 A | 4/2013 |

(Continued)

OTHER PUBLICATIONS

Non-Final Office Action issued by The United States Patent and Trademark Office for U.S. Appl. No. 15/043,977, dated Apr. 19, 2018, 18 pages.

(Continued)

*Primary Examiner* — Bitew A Dinke
(74) *Attorney, Agent, or Firm* — Panitch Schwarze Belisario & Nadel LLP

(57) ABSTRACT

Some embodiments of the present BOP control systems include a system controller configured to actuate a first BOP function by communicating one or more commands to one or more nodes of a functional pathway selected from one or more available functional pathways associated with the first BOP function, each node comprising an actuatable component configured to actuate in response to a command received from the system controller, each node having one or more sensors configured to capture a first data set corresponding to actuation of the component and a processor configured to analyze the first data set to determine a useful life remaining of the component and/or compare the first data set to a second data set corresponding to a simulation of actuation of the component.

28 Claims, 12 Drawing Sheets

Related U.S. Application Data

(60) Provisional application No. 62/116,541, filed on Feb. 15, 2015, provisional application No. 62/142,422, filed on Apr. 2, 2015.

(56) References Cited

U.S. PATENT DOCUMENTS

| | | | |
|---|---|---|---|
| 2005/0143956 A1* | 6/2005 | Long | F04D 15/0088 702/184 |
| 2006/0126495 A1 | 6/2006 | Guichard et al. | |
| 2006/0161326 A1 | 7/2006 | Jaeggle et al. | |
| 2008/0128138 A1 | 6/2008 | Radi | |
| 2008/0135291 A1 | 6/2008 | Hall et al. | |
| 2008/0163619 A1* | 7/2008 | Smith | F15B 21/0423 60/456 |
| 2008/0185476 A1 | 8/2008 | Suisse et al. | |
| 2009/0229694 A1 | 9/2009 | Fenny et al. | |
| 2012/0000646 A1* | 1/2012 | Liotta | E21B 33/062 166/85.4 |
| 2012/0090459 A1 | 4/2012 | Lauffer et al. | |
| 2012/0219933 A1* | 8/2012 | Chen | G09B 19/24 434/219 |
| 2012/0283963 A1* | 11/2012 | Mitchell | G05B 23/0283 702/34 |
| 2013/0054034 A1* | 2/2013 | Ebenezer | E21B 33/06 700/282 |
| 2013/0118755 A1* | 5/2013 | Kotrla | E21B 33/0355 166/363 |
| 2013/0153241 A1 | 6/2013 | Mallinson et al. | |
| 2013/0158755 A1* | 6/2013 | Tang | B60W 20/50 700/29 |
| 2014/0102713 A1* | 4/2014 | Gutierrez | E21B 33/0355 166/363 |
| 2014/0131049 A1* | 5/2014 | Bourgeau | E21B 41/0007 166/363 |
| 2014/0231075 A1 | 8/2014 | Springett et al. | |
| 2015/0034384 A1 | 2/2015 | Leuchtenberg | |
| 2015/0094866 A1* | 4/2015 | Pereira | E21B 33/064 700/282 |
| 2015/0134189 A1* | 5/2015 | Wash | G07C 5/006 701/29.4 |
| 2016/0090810 A1* | 3/2016 | Holmes | E21B 34/16 166/363 |
| 2016/0131164 A1* | 5/2016 | Carpenter | F15B 19/005 92/261 |
| 2016/0161547 A1* | 6/2016 | Farquhar, III | G01K 13/00 324/549 |
| 2016/0237773 A1* | 8/2016 | Dalton | G05B 23/0283 |
| 2016/0258498 A1* | 9/2016 | Versteyhe | F16D 48/062 |
| 2016/0340998 A1 | 11/2016 | Holmes | |

FOREIGN PATENT DOCUMENTS

| | | |
|---|---|---|
| CN | 103649470 A | 3/2014 |
| EP | 2565366 A2 | 3/2013 |

OTHER PUBLICATIONS

International Search Report and Written Opinion in International Application No. PCT/US2016/017979 dated Jul. 8, 2016.
Extended European Search Report issued by the European Patent Office for Application No. 16750056,0, dated Jan. 31, 2019, 10 pages.
First Office Action issued by the Chinese Patent Office for Application No. 201680021716.7, dated Jun. 6, 2019, 22 pages including English translation.
Second Office Action issued by the Chinese Patent Office for Application No. 201680021716.7, dated Apr. 27, 2020, 25 pages including English translation.
Preliminary Office Action issued by the Brazilian Patent Office for Application No. BR1120170174901, dated Jun. 30, 2020, 7 pages including English translation.
Office Action issued by the European Patent Office for U.S. Appl. No. 16/750,056, dated Jul. 10, 2020, 3 pages.
Examination Report No. 1 issued by the Australian Patent Office for Application No. 2016218967, dated Apr. 17, 2020, 4 pages.
Liu Gang et al., "Analysis and Control of Drilling Well Control Risk", pp. 51-75, Petroleum Industry Press (Dec. 2011).
Office Action issued by the Chinese Patent Office for Application No. 20168021716, dated Aug. 4, 2021, 18 pages—English Translation Available.
Office Action issued by the European Patent Office for Application 16750056 dated Jul. 5, 2021, 6 pages.

\* cited by examiner (PRIOR-ART)

BOP CONTROL SYSTEMS AND RELATED METHODS

CROSS-REFERENCE TO RELATED APPLICATIONS

This application is a continuation of U.S. patent application Ser. No. 15/043,977, filed Feb. 15, 2016, entitled "BOP Control Systems and Related Methods", which claims priority to U.S. Provisional Application No. 62/116,541, filed Feb. 15, 2015, entitled BOP Control Systems and Related Methods", and U.S. Provisional Application No. 62/142,422, filed Apr. 2, 2015, entitled "BOP Control Systems and Related Methods", each of which is incorporated herein by reference.

BACKGROUND

1. Field of Invention

The present invention relates generally to blowout preventer control systems, and more specifically, but not by way of limitation, to blowout preventer control systems including distributed prognostics and/or diagnostics capabilities.

2. Description of Related Art

A blowout preventer (BOP) is a mechanical device, usually installed redundantly in stacks, used to seal, control, and/or monitor oil and gas wells. Typically, a blowout preventer includes a number of devices, such as, for example, rams, annulars, accumulators, test valves, failsafe valves, kill and/or choke lines and/or valves, riser joints, hydraulic connectors, and/or the like, many of which may be hydraulically actuated.

BOP operational events may account for approximately 50% of equipment-related non-productive downtime (NTT) for deep-water drilling rigs. Among such BOP operational events, approximately 55% may be directly linked to malfunctions in a BOP control system.

Typically, BOPs and BOP control systems ("BOP systems") are operated and maintained on a largely trial-and-error basis. For example, in a typical BOP system, an operator may have to exercise some degree of subjective judgment as to when a particular BOP system component should be undergo maintenance, be replaced, and/or the like. While maintenance plans and other system requirements may exist for particular components, these plans and requirements are typically developed after the components have been designed and/or implemented. Thus, in some instances, components may be under-maintained and/or implemented beyond their useful life, leading to component failure, and in other instances, components may be unnecessarily maintained and/or replaced, increasing operating costs and/or presenting a risk of self-induced and/or premature component failure. Additionally, in the event of a BOP system component failure, such existing BOP systems typically require costly NPT to adequately identify the failed component in a process of elimination approach—sometimes necessitating extraction of the BOP to the surface.

Recently, some BOP systems have incorporated limited component monitoring and reporting capability. However, such incremental improvements fail to address the importance of BOP system availability, reliability, and fault-tolerance, particularly when dealing with safety-critical BOP functions.

Existing BOP systems, including those with limited component monitoring and reporting capability, may also fail to account for the operational condition of the BOP system (e.g., whether the system is under construction, is drilling, is producing, and/or the like). Such operational conditions may play a crucial role in making proper operational and/or maintenance choices with respect to BOP system components.

SUMMARY

Some embodiments of the present BOP control systems are configured, through prognostic and/or diagnostic capability distributed to one or more nodes, each including a BOP system component, to maximize system availability (e.g., by monitoring for degradation of one or more BOP system components, anticipating failure of the one or more BOP system components, and/or the like). Some embodiments of the present BOP control systems are configured, through prognostic and/or diagnostic capability distributed to one or more nodes, each including a BOP system component, redundant hardware (e.g., two or more redundant BOP system components and/or two or more redundant BOP functions for accomplishing a same or a similar outcome, such as, for example, two or more ram-type BOPs, each with a close function configured to seal a same well bore), two or more redundant functional pathways for actuating a same BOP function, and/or the like, to maximize system reliability and/or system fault tolerance.

Some embodiments of the present BOP control systems comprise: a system controller configured to actuate a first BOP function by communicating one or more commands to one or more nodes of a functional pathway selected from one or more available functional pathways associated with the first BOP function, each node comprising an actuatable component configured to actuate in response to a command received from the system controller, each node having one or more sensors configured to capture a first data set corresponding to actuation of the component and a processor.

Some embodiments of the present BOP control systems comprise: a system controller configured to actuate a first BOP function by communicating one or more commands to one or more nodes of a functional pathway selected from at least two functional pathways associated with the first BOP function; each node comprising an actuatable component configured to actuate in response to a command received from the system controller, each node having one or more sensors configured to capture a first data set corresponding to actuation of the component; and a processor configured to analyze the first data set to determine a useful life remaining of the component; and communicate the useful life remaining of the component to the system controller; where the system controller is configured to assign a risk level to each of the at least two functional pathways based, at least in part, on the useful life remaining of at least one of the one or more nodes of the functional pathway; and identify at least one of the at least two functional pathways for actuating the first BOP function based, at least in part, on the risk levels of each of the at least two functional pathways.

Some embodiments of the present BOP control systems comprise a system controller configured to actuate a first BOP function by communicating one or more commands to one or more nodes of a functional pathway selected from one or more functional pathways associated with the first BOP function; each node comprising an actuatable component configured to actuate in response to a command received from the system controller, each node having one or more sensors configured to capture at least two sensed values during actuation of the component and a processor configured to receive the at least two sensed valves from at least one of the one or more nodes; to obtain an expected value of a model based on at least one of the at least two sensed values, to compare the expected value to the other of the at least two sensed values to obtain a difference between the two values; and to communicate to the system controller one or more of the following: (i) a fault if the difference between the two values exceeds a threshold; (ii) a useful life remaining of the actuatable component based at least on the difference between the two values; (iii) a risk level based at least on the difference between the two values; or (iv) the difference between the two values.

Some embodiments of the present BOP control systems comprise: a system controller configured to actuate a first BOP function by communicating one or more commands to one or more nodes of a functional pathway selected from one or more available functional pathways associated with the first BOP function; each node comprising an actuatable component configured to actuate in response to a command received from the system controller, each node having one or more sensors configured to capture a first data set during an actuation of the component and a processor configured to adjust one or more coefficients of a model such that the adjusted model approximates one or more values from the first data set; and communicate to the system controller data based at least on at least one of the one or more coefficients of the adjusted model.

In some embodiments, the component of at least one node comprises a hydraulic manifold including one or more actuatable valves. In some embodiments, the component of at least one node comprises a hydraulic pump. In some embodiments, the hydraulic pump is battery powered.

In some embodiments, at least one node comprises a virtual sensor.

In some embodiments, the processor of each node is configured to analyze the first data set to determine a useful life remaining of the component. In some embodiments, the processor of each node is configured to communicate the useful life remaining of the component to the system controller. In some embodiments, the system controller is configured to communicate the useful life remaining of the component of each node to a user. In some embodiments, the processor of each node is configured to communicate a fault to the system controller if the useful life remaining of the component is below a threshold.

In some embodiments, the processor of each node is configured to analyze the first data set to identify an abnormal actuation of the component and communicate a fault to the system controller if an abnormal actuation of the component is identified.

In some embodiments, the first data set includes data indicative of a number of actuation cycles of the component. In some embodiments, the first data set includes data indicative of a response time of the component.

In some embodiments, the processor of each node is configured to compare the first data set to a second data set corresponding to a simulation of actuation of the component and communicate a fault to the system controller if differences between the first data set and the second data set exceed a threshold.

In some embodiments, at least one node comprises a memory configured to store at least a portion of the first data set. In some embodiments, at least one node comprises a memory configured to store at least a portion of the second data set. Some embodiments comprise a memory in communication with each node of a functional pathway.

In some embodiments, at least one node is configured to communicate with the system controller wirelessly. In some embodiments, at least one node is configured to communicate with the system controller through a wired connection. In some embodiments, at least one node is configured to communicate with at least one controller outside of the BOP control system.

In some embodiments, the system controller is configured to scan the BOP control system for available functional pathways for actuating the first BOP function. In some embodiments, the system controller is configured to communicate to a user a number of available functional pathways for actuating the first BOP function.

In some embodiments, the system controller is configured to remove a first functional pathway from the one or more available functional pathways if one or more nodes of the first functional pathway communicates a fault to the system controller. In some embodiments, the system controller is configured to remove a second functional pathway from one or more available functional pathways associated with a second BOP function if the second functional pathway includes one or more of the one or more nodes of the first functional pathway that communicates a fault to the system controller. In some embodiments, the system controller is configured to select a second BOP function if one or more nodes of the first functional pathway associated with the first BOP function communicates a fault to the system controller.

In some embodiments, the system controller is configured to assign a risk level to the first BOP function. In some embodiments, the risk level is assigned based, at least in part, on a number of available functional pathways for actuating the first BOP function. In some embodiments, the risk level is assigned, based, at least in part, on a harm associated with a failure to actuate the first BOP function. In some embodiments, the risk level is assigned based, at least in part, on a type of fault communicated by one or more nodes of a functional pathway.

In some embodiments, the one or more available functional pathways comprises a first functional pathway and a second functional pathway, and the system controller is configured to actuate the first BOP function by communicating one or more commands to one or more nodes of the second functional pathway if one or more nodes of the first functional pathway communicates a fault to the system controller.

Some embodiments of the present methods for actuating a BOP function comprise: selecting a first functional pathway from two or more available functional pathways associated with the first BOP function, communicating one or more commands to an actuatable component of each of one or more nodes of the first functional pathway to actuate the component, where actuation of the component of each of the one or more nodes of the first functional pathway actuates the first BOP function, and receiving, from at least one of the one or more nodes of the first functional pathway, information associated with actuation of the component. Some embodiments comprise storing the received information in a memory.

Some embodiments comprise scanning a BOP control network for available functional pathways for actuating the first BOP function. Some embodiments comprise communicating to a user a number of available functional pathways for actuating the first BOP function In some embodiments, the received information includes a useful life remaining of the component. In some embodiments, the received information indicates a fault if the useful life remaining of the component is below a threshold. In some embodiments, the received information includes an identification of abnormal actuation of the component. In some embodiments, the received information indicates a fault if an abnormal actuation of the component is identified. In some embodiments, the received information includes differences between a first data set corresponding to actuation of the component and a second data set corresponding to a simulation of actuation of the component. In some embodiments, the received information indicates a fault if differences between the first data set and the second data set exceed a threshold.

Some embodiments comprise selecting a second functional pathway from the two or more available functional pathways associated with the first BOP function if the received information indicates a fault. Some embodiments comprise removing the first functional pathway from the two or more available functional pathways if the received information indicates a fault. Some embodiments comprise removing a second functional pathway from two or more available functional pathways associated with a second BOP function if the received information indicates a fault of a node common to the first functional pathway and the second functional pathway. Some embodiments comprise selecting a second BOP function if the received information indicates a fault.

Some embodiments comprise assigning a risk level to the first BOP function. In some embodiments, the risk level is assigned based, at least in part, on a number of available functional pathways for actuating the first BOP function. In some embodiments, the risk level is assigned based, at least in part, on a harm associated with a failure to actuate the first BOP function. In some embodiments, the risk level is assigned based, at least in part, on a type of a fault indicated by the received information.

The terms "a" and "an" are defined as one or more unless this disclosure explicitly requires otherwise.

Further, a device or system (or a component of either) that is configured in a certain way is configured in at least that way, but can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus or system that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

As will be described below, some embodiments of the present BOP control systems include advanced, and in some instances, process-aware, distributed (e.g., node-based) prognostics and/or diagnostics capabilities that may ascertain, analyze, and/or predict performance of a BOP system and/or nodes and/or components thereof.

Figure 1:
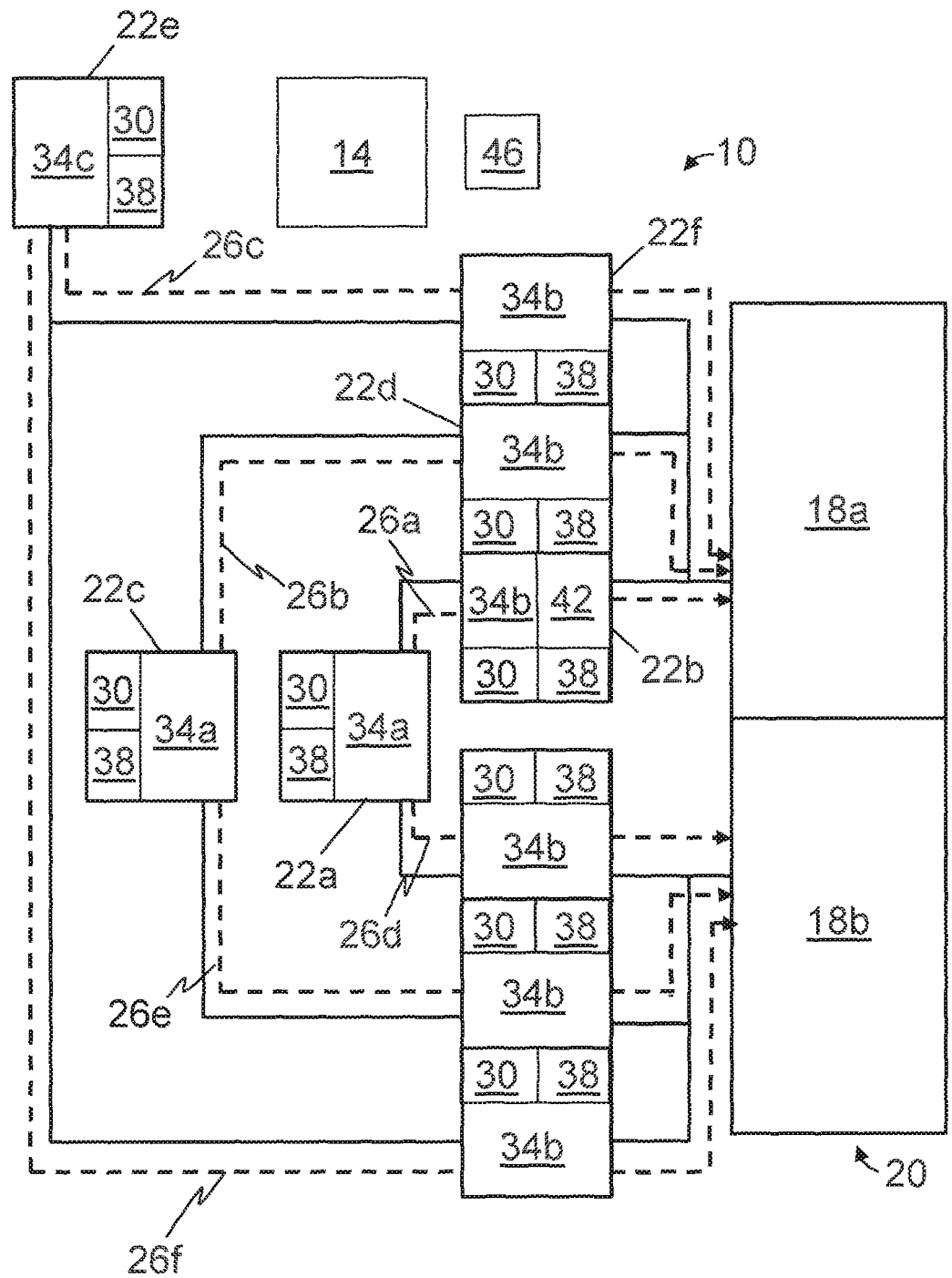
FIG. 1 is a diagram of a first embodiment of the present BOP control systems.

Referring now to the drawings, and more particularly to FIG. 1, shown therein and designated by the reference numeral 10*a* is a first embodiment of the present BOP control systems. System 10*a* presents an illustrative implementation of the present BOP control systems and is provided and discussed, in large part, for clarity. Of course, as can be appreciated, other embodiments of the present BOP control systems may include substantially more complexity (e.g., further BOP functions, functional pathways, nodes, components, and/or the like). In the embodiment shown, system 10*a* comprises a system controller 14 configured to actuate one or more BOP functions (e.g., 18*a* and/or 18*b*) of a BOP 20. As used in this disclosure, the term "blowout preventer" or "BOP" includes, but is not limited to, a single blowout preventer, as well as a blowout preventer assembly that may include more than one blowout preventer (e.g., a blowout preventer stack). BOP functions actuatable with the present BOP control systems may include any suitable function, such as, for example, a function associated with a ram, annular, accumulator, test valve, failsafe valve, kill and/or choke line and/or valve, riser joint, hydraulic connector, and/or the like (e.g., ram open, ram close, and/or the like). System controller 14 may comprise a physical machine and may include a housing, processor, memory, human-machine interface, and/or the like.

For example, in this embodiment, system controller 14 is configured to actuate a BOP function (e.g., 18*a*), at least in part, by communicating one or more commands to one or more nodes (e.g., 22*a*, 22*b*, 22*c*, 22*d*, 22*e*, and/or 22*f*) of a functional pathway (sometimes referred to as a "success path") (e.g., 26*a*, 26*b*, or 26*c*) associated with the BOP function and selected from one or more available functional pathways (e.g., where available functional pathways do not include a failed or failing node or a node with a failed or failing component, as described in more detail below). In the depicted embodiment, each node comprises an actuatable component (e.g., 34*a*, 34*b*, 34*c*) configured to actuate, for example, in response to a command received from system controller 14.

In the embodiment shown, actuation of one or more components of each node of a functional pathway may actuate a BOP function associated with the functional pathway. To illustrate, in this embodiment, first BOP function 18*a* is associated with three functional pathways, 26*a*, 26*b*, and 26*c*. In the depicted embodiment, functional pathway 26*a* includes node 22*a*, which comprises a hydraulic pump 34*a* (e.g., which may be powered by an electrical motor), and node 22*b*, which comprises a hydraulic manifold 34*b* (e.g., which may include one or more actuatable valves). In the embodiment shown, system controller 14 may command node 22*a* to actuate hydraulic pump 34*a* and node 22*b* to actuate one or more actuatable valves of hydraulic manifold 34*b* to open a hydraulic fluid pathway to first BOP function 18*a*, thereby allowing hydraulic fluid provided by the hydraulic pump to flow through the hydraulic manifold and to the first BOP function, thus actuating the first BOP function. Similarly, in this embodiment, functional pathway 26*b* includes node 22*c*, which comprises a hydraulic pump 34*a*, and node 22*d*, which comprises a hydraulic manifold 34*b*. In the depicted embodiment, system controller 14 may command node 22*c* to actuate hydraulic pump 34*a* and node 22*d* to actuate one or more actuatable valves of hydraulic manifold 34*b* to open a hydraulic fluid pathway to first BOP function 18*a*, thus actuating the first BOP function.

For further example, in the embodiment shown, functional pathway 26*c* includes node 22*e*, which comprises a hydraulic power unit 34*c* (e.g., which may be disposed above-sea), and node 22*f*, which comprises a hydraulic manifold 34*b*. In this embodiment, system controller 14 may command node 22*e* to actuate hydraulic power unit 34*c* and node 22*f* to actuate one or more actuatable valves of hydraulic manifold 34*b* to open a hydraulic fluid pathway to first BOP function 18*a*, thereby allowing hydraulic fluid provided by the hydraulic power unit to flow through the hydraulic manifold and to the first BOP function, thus actuating the first BOP function. Of course, functional pathways 26*a*, 26*b*, and 26*c*, nodes 22*a*, 22*b*, 22*c*, 22*d*, 22*e*, and 22*f*, and components 34*a*, 34*b*, and 34*c* are provided only by way of example, as the present BOP control systems can comprise any suitable number of functional pathways, which may include any suitable number of nodes having any suitable component(s).

In the embodiment shown, system controller 14 is configured to scan BOP control system 10*a* for available functional pathways (e.g., 26*a*, 26*b*, 26*c*, 26*d*, 26*e*, and/or 26*f*) for actuating a BOP function (e.g., 18*a* and/or 18*b*). For example, in the depicted embodiment, each node (e.g., 22*a*, 22*b*, 22*c*, 22*d*, 22*e*, and 22*f*) may be directly accessible by system controller 14, and each node may contain information (e.g., stored in a memory, described in more detail below) that corresponds to the nodes location and/or function (e.g., a function of an actuatable component of the node) within BOP control system 10*a*. Thus, in this embodiment, system controller 14 may, by communicating with each of one or more nodes connected to BOP control system 10*a*, identify available BOP function(s), as well as respective functional pathways for actuating the BOP function(s). In the embodiment shown, system controller 14 may be in communication with one or more nodes in any suitable fashion, such as, for example, via a wired and/or wireless network. In some embodiments, a system controller (e.g., 14) may be pre-programmed with locations and/or functions of one or more nodes and/or available functional pathways for actuating a BOP function. In addition, it is also contemplated that actuation of the BOP function may further require control over and/or actuation of components other than component(s) of each node, for example, components disposed between nodes, between system controller 14 and one or more nodes, and/or between the BOP function and one or more nodes.

In the depicted embodiment, system controller 14 may be configured to identify one or more functional pathways and/or one or more BOP functions that are alternate to other functional pathways and/or other BOP functions (e.g., by assuming a failure of at least one of the nodes). For example, in the embodiment shown, to identify functional pathway 26*b* associated with first BOP function 18*a*, system controller 14 may assume a failure of node 22*a*, 22*b*, 22*e* and/or 22*f*. For further example, in this embodiment, system controller 14 may identify a BOP function alternate to first BOP function 18*a* (e.g., if the first BOP function is a close function on a ram-type BOP, an alternate BOP function may be a close function on a separate and redundant ram type BOP), by assuming a failure of a node of functional pathway 26*a*, 26*b*, and/or 26*c*. Two BOP functions may be redundant to each other in that each may be configured to achieve a same or a similar outcome as the other (e.g., each sealing a same well bore).

In some embodiments, a system (e.g., 10*a*) may include two or more system controllers (e.g., 14). In such embodiments, a second one of the two or more system controllers may be configured to perform at least some of the functions of a first one of the two or more system controllers. In such embodiments, if the first system controller malfunctions, fails, or otherwise is rendered inoperable, the second system controller may (e.g., automatically) perform function(s) of the first system controller.

In the embodiment shown, each node comprises one or more sensors 38. Sensors (e.g., 38) of the present BOP control systems can comprise any suitable sensor, such as, for example, a temperature sensor (e.g., a thermocouple, resistance temperature detector (RTD), and/or the like), pressure sensor (e.g., a piezoelectric pressure sensor, strain gauge, and/or the like), velocity sensor (e.g., an observation-based sensor, accelerometer-based sensor, and/or the like), acceleration sensor, flow sensor, clock, and/or the like, whether physical and/or virtual (e.g., implemented by a processor 30 of a node).

At least through respective nodes (e.g., 22*a*, 22*b*, 22*c*, 22*d*, 22*e*, and 22*f*) including respective processors (e.g., 30) and respective sensor(s) (e.g., 38), some embodiments of the present BOP control systems (e.g., 10*a*) may be configured for distributed (e.g., node-based) diagnostics and/or prognostics capabilities. For example, in this embodiment, for each of the nodes, one or more sensors 38 of the node are configured to capture a first data set corresponding to actuation of an actuatable component of the node, whether during actual use of the actuatable component (e.g., in combination with actuatable component(s) of other node(s) of its respective functional pathway(s) to actuate a BOP function) or during a performance or function test of the actuatable component, and such actuation may be in response to a command received from system controller 14 (e.g., an instruction signal received from the system controller 14). In the depicted embodiment, the first data set may include one or more values, which may be indicative of any suitable parameter(s), such as, for example, a number of actuation cycles of the actuatable component of the node, a response time of the actuatable component (e.g., a time required for the component to complete an actuation), pressure, temperature, flow rate, and/or the like of hydraulic fluid within the component, and/or the like, and such value(s) may be included in the first data set as a table or function over a period of time.

Figure 2A:
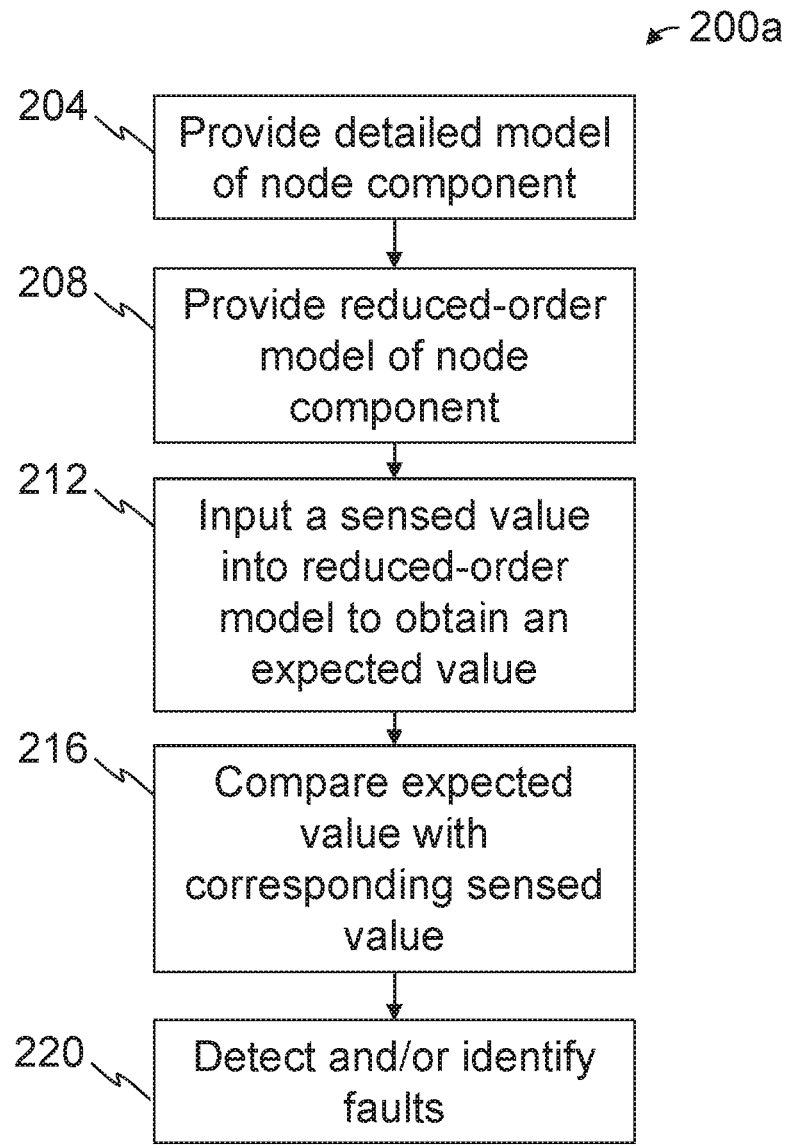
FIGS. 2A and 2B are flow charts that each illustrates an example of node-based diagnostics.
Figure 2B:
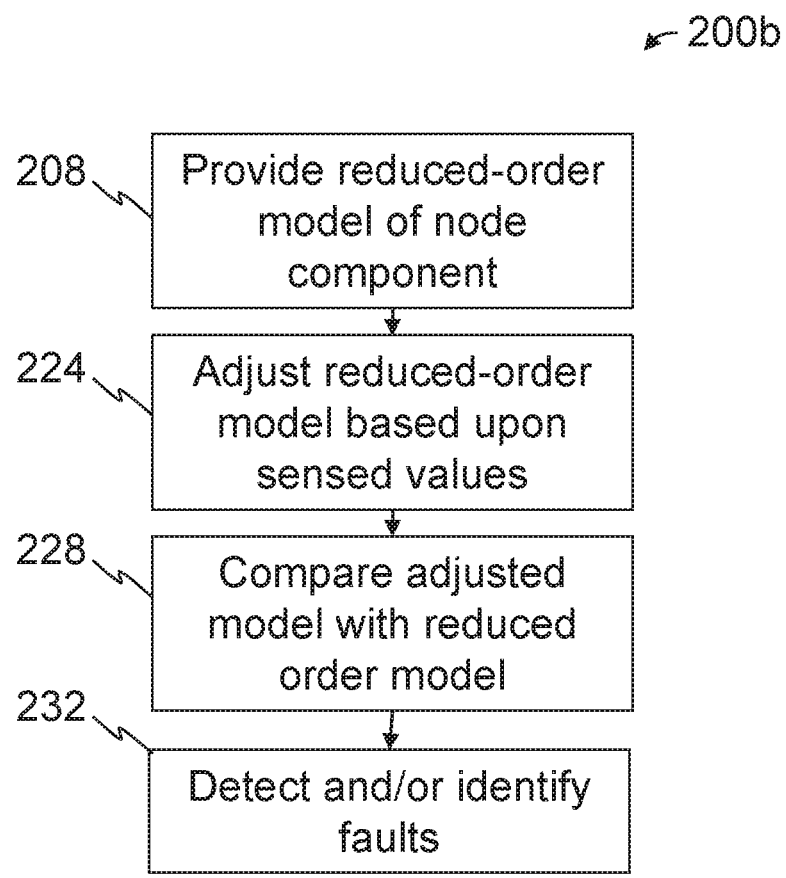

In the depicted embodiment, processor 30 of each node (e.g., 22a, 22b, 22c, 22d, 22e, and 22f) is configured to compare the first data set to a second data set comprising and/or corresponding to a simulation (e.g., model, mathematical representation, which may be based on one or more functions, and/or the like) of actuation of the component of the node (e.g., an example of node-based diagnostics). Referring now to FIGS. 2A and 2B, shown are flow charts of two examples 200a, 200b of such node-based diagnostics. In the example shown in FIG. 2A, at step 204, a detailed model for the component of the node may be provided.

Figure 3:
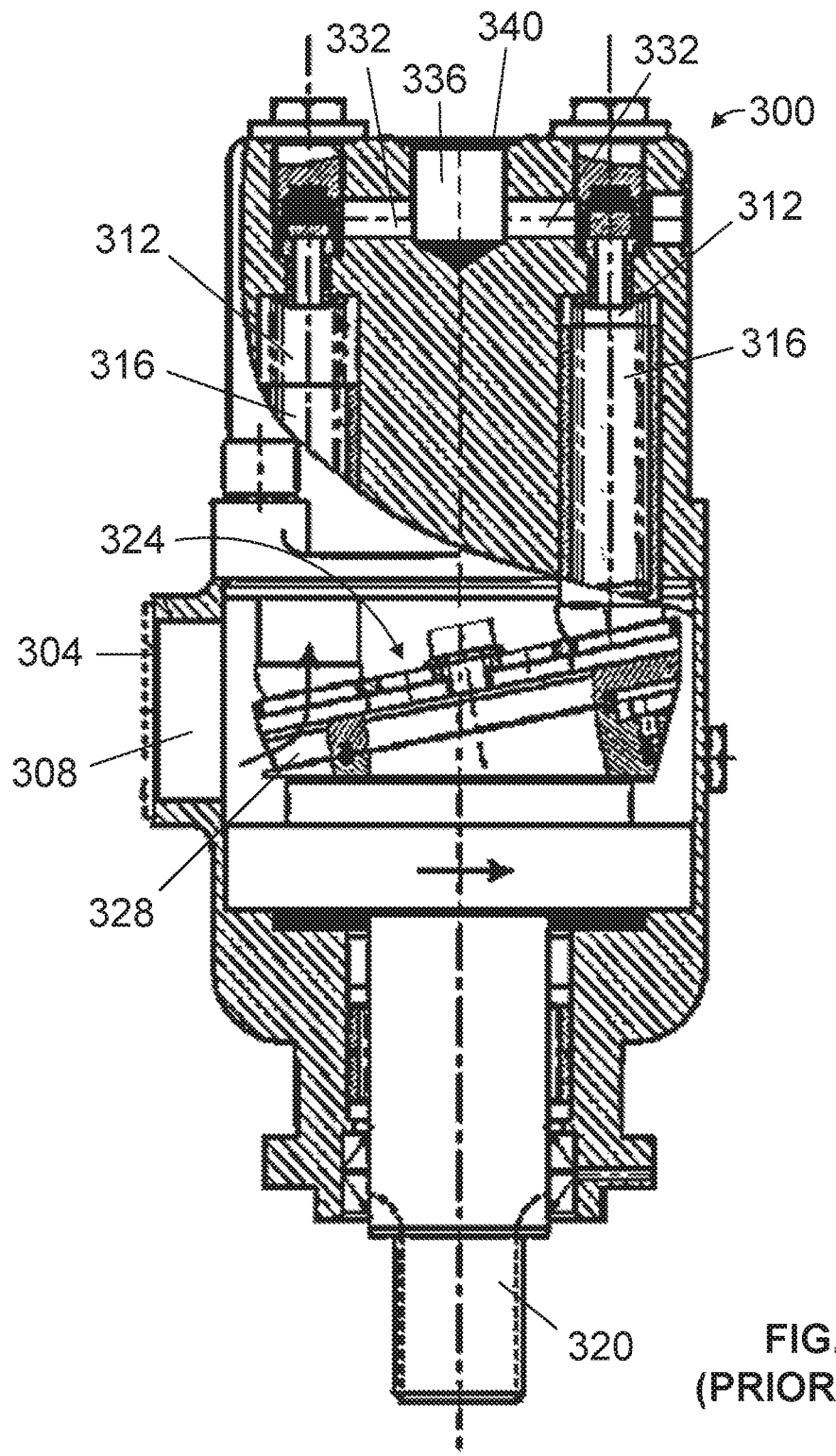
FIG. 3 is a partially cutaway and partially cross-sectional side view of an axial piston pump, which may suitable for use as a component of a node in some embodiments of the present systems.

Referring additionally to FIG. 3, shown is a partially cutaway and partially cross-sectional side view of an axial piston pump 300, which may be suitable for use as an actuatable component of a node. As shown, in this example, axial piston pump 300 comprises an inlet 304 in fluid communication with an inflow volume 308. In the depicted example, axial piston pump 300 includes one or more cylinders 312, each having a respective one of one or more pistons 316 slidably disposed therein. In the example shown, each of one or more pistons 316 is coupled to a rotatable pump shaft 320 via a swash plate mechanism 324 such that, as the pump shaft is rotated, each of the one or more pistons may axially translate within a respective one of one or more cylinders 312. In this example, each of one or more cylinders 312 is in fluid communication with a respective cylinder filling volume 328 and a respective cylinder emptying volume 332. In the example shown, axial piston pump 300 comprises an outlet 340 in fluid communication with an outflow volume 336. Thus, in this example, as pump shaft 320 is rotated, each of one of more pistons 316 may axially reciprocate within a respective one of one or more cylinders 312, causing fluid communication from inlet 304 to outlet 340.

In providing a detailed model for axial piston pump 300 (e.g., step 204), it can be shown that:

$$Q_i = A_i \sqrt{\frac{2}{\rho_i} |p_i - p_s|} \tag{1}$$

where $Q_i$ is the mass flow rate of fluid flowing into inlet 304, $A_i$ is the flow cross-sectional area of the inlet, $\rho_i$ is the density of fluid flowing into the inlet, $p_i$ is the pressure of fluid flowing into the inlet, and $p_s$ is the pressure of fluid flowing through inflow volume 308 [1].

For axial piston pump 300, for a given one of one or more cylinders 312, it can be shown that:

$$Q_u = A_u \sqrt{\frac{2}{\rho_u} |p_s - p_c|} \tag{2}$$

where $Q_u$ is the mass flow rate of fluid flowing through a cylinder filling volume 328 respective to the given one of the one or more cylinders, $A_u$ is the flow cross-sectional area of the respective cylinder filling volume, $\rho_u$ is the density of fluid flowing through the respective cylinder filling volume, and $p_c$ is the pressure of fluid flowing through the given one of the one or more cylinders [1].

For axial piston pump 300, it can be shown that:

$$Q_o = A_o \sqrt{\frac{2}{\rho_o} |p_v - p_o|} \tag{3}$$

where $Q_o$ is the mass flow rate of fluid flowing out of outlet 340, $A_o$ is the flow cross-sectional area of the outlet, $\rho_o$ is the density of fluid flowing out of the outlet, $p_v$ is the pressure of fluid flowing through outflow volume 336, and $p_o$ is the pressure of fluid flowing out of the outlet [1].

For axial piston pump 300, the rate of change of pressure of fluid flowing through outflow volume 336, or $$\frac{dp_v}{dt},$$

may be shown as:

$$\frac{dp_v}{dt} = \frac{B}{V_c} (\Sigma_j Q_{k,j} - Q_o) \tag{4}$$

where B is the bulk modulus of portion(s) of the axial piston pump which define cylinder emptying volume(s) 332, $V_c$ is the sum of the instantaneous volume of each of one or more cylinders 312, and $Q_k$ is the mass flow rate of fluid flowing through a cylinder emptying volume 332 respective to a j one of one or more cylinders 312 [1].

In the depicted example, at step 204, node and/or component fault(s) may also be considered (e.g., modeled) in providing the detailed model. For example, faults associated with a node including axial piston pump 300 may include gain and/or offset faults of at least one of sensors(s) 38 of the node (e.g., a speed sensor configured to capture data indicative of a rotational speed of pump shaft 320 and/or of a rotational speed of a motor coupled to the pump shaft, which may also comprise a component of the node), external fluid leakage (e.g., fluid leakage that may occur downstream of outlet 340), internal leakage (e.g., due to clearance(s) between one or more of one or more cylinders 312 and respective one(s) of one or more pistons 316), and/or the like. To illustrate, for axial piston pump 300, internal leakage, or $Q_l$, may be shown as:

$$Q_l = \frac{\pi D_c \Delta r^3}{12 \eta x_k} (p_c - p_s) \tag{5}$$

where $D_c$ is the diameter of a given one of one or more cylinders 312, $\Delta r$ is the radial clearance between a sidewall of the given one of the one or more cylinders and a respective one of one or more pistons 312, $\eta$ is the dynamic viscosity of fluid flow through the given one of the one or more cylinders, and $x_k$ is the immediate axial displacement of the respective one of the one or more pistons relative to the given one of the one or more cylinders [1].

Considering Eq. (1)-(5), above, the rate of change of pressure of fluid flowing through a given one of one or more cylinders 316, or $$\frac{dp_c}{dt},$$

may be shown as:

$$\frac{dp_c}{dt} = \frac{B}{V_c}(A_c v_k + Q_i - Q_l - Q_k) \quad (6)$$

where $A_c$ is the flow cross-sectional area of the given one of the one or more cylinders and $v_k$ is the immediate axial velocity of one of one or more pistons 312 respective to the given one of the one or more cylinders [1].

For a more detailed discussion of Eqs. (1)-(6), above, see [1] Radovan Petrović, *Mathematical Modeling and Experimental Research of Characteristic Parameters Hydrodynamic Processes of a Piston Axial Pump*, 55(2009)4 J. of Mech. Eng'g 224 (2009), which is expressly incorporated by reference in its entirety, and more specifically, section 1.1, entitled "Mathematical Model of a Pump Process," which begins on the first column of page 225 and ends on the first column of page 226.

In the example shown, at step 208, a reduced-order model of the component of the node may be provided (e.g., a reduced-order model based, at least in part, on the detailed model of the component). For example, the detailed model for axial piston pump 300 provided in Eqs. (1)-(6), above, may be used to derive a reduced-order model for the axial piston pump that approximates the detailed model. To illustrate, a reduced-order model (e.g., derived, at least in part, by one or more polynomial regressions of the detailed model) of axial piston pump 300 may be:

$$Q_{pump} = a_0 N_{pump} + b_0 \Delta P_{pump} + c_0 \sqrt{\Delta P_{pump}} + d_0 \quad (7)$$

where $Q_{pump}$ is the mass flow rate of fluid flow provided by the axial piston pump, $N_{pump}$ may correspond to a rotational speed of pump shaft 320 of the axial piston pump, $\Delta P_{pump}$ is the pressure difference between outlet 340 and inlet 304, and $a_0$, $b_0$, $c_0$, and $d_0$ are coefficients that may be adjusted to fit the reduced-order model to the detailed model.

Figure 4A:
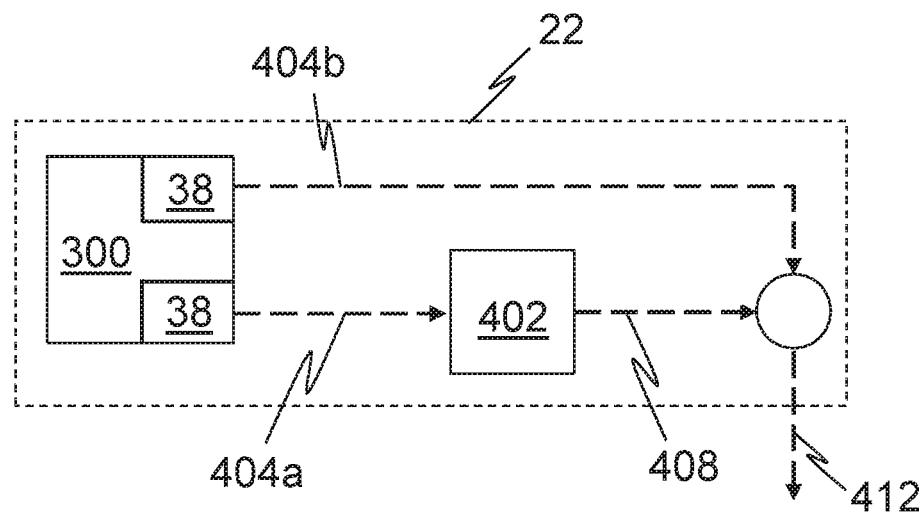
FIG. 4A is a diagram of one example of node-based fault detection and/or identification.

Such mathematical models, whether detailed (e.g., Eqs. (1)-(6)) and/or reduced-order (e.g., Eq. (7)), may be used to detect and/or identify node and/or component faults. For example, a first data set containing values corresponding to actuation of axial piston pump 300 may be compared with a second data set corresponding to a simulation or theoretical model of actuation of the axial piston pump, such as, for example, the reduced-order model provided in Eq. (7). Referring additionally to FIG. 4A, in the depicted example, one or more sensors 38 of a node 22g including axial piston pump 300 may provide signal 404a, which may be indicative of a pressure difference between outlet 340 and inlet 304 of the axial piston pump, and signal 404b, which may be indicative of a mass flow rate of fluid flow provided by the axial piston pump (e.g., and such indicated values may be included in the first data set). In the example shown, one or more indicated values (e.g., as indicated by signals 404a and 404b) may be used to evaluate a model 402. To illustrate, in the example of FIG. 2A, a pressure difference between outlet 340 and inlet 304 of axial piston pump 300 (e.g., indicated by signal 404a) may be input into a model 402 (e.g., Eq. (7))(step 212) to determine an expected value 408, such as, for example, an expected mass flow rate of fluid provided by the axial piston pump at the indicated pressure difference (e.g., and such expected values may be included in the second data set). In the depicted example, the expected value may be compared with an indicated value to ascertain differences 412 between the expected and indicated values (step 216). To illustrate, in this example, an expected mass flow rate of fluid provided by axial piston pump 300 (e.g., expected value 408) may be compared to an indicated mass flow rate of fluid provided by the axial piston pump (e.g., indicated by signal 404b) to determine differences 412 between the expected and indicated values. In the example shown, at step 220, component fault(s) may be detected and/or identified (e.g., if differences 412 exceed a threshold). In the depicted embodiment, processor 30 of the node may be configured to communicate differences 412 system controller 14, which in turn, may be configured to communicate the differences to a user (e.g., via a human-machine interface).

Figure 4B:
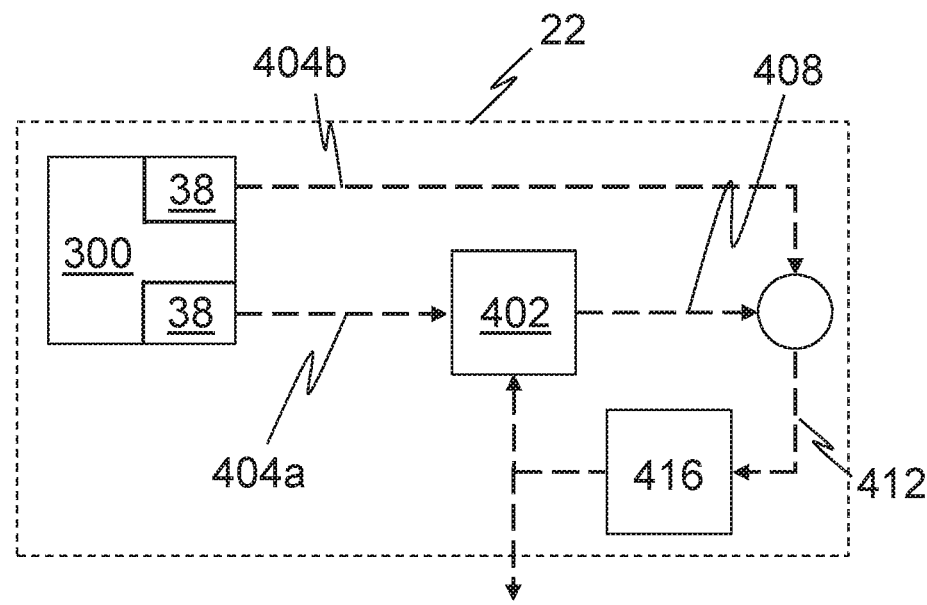
FIG. 4B is a diagram of one example of node-based fault detection and/or identification.

Referring to FIG. 2B, in this example 200b, at step 224, the reduced-order model may be adjusted based on actuation of the component of the node (e.g., fit to one or more values from the first data set). For example, an adjusted or fitted reduced-order model based upon the reduced-order model provided in Eq. (7) may be shown as:

$$Q_{pump} = \hat{a} N_{pump} + \hat{b} \Delta P_{pump} + \hat{c} \sqrt{\Delta P_{pump}} + \hat{d} \quad (8)$$

where $\hat{a}$, $\hat{b}$, $\hat{c}$, and $\hat{d}$ are variable coefficients that may be adjusted (e.g., over time) such that Eq. (8) approximates one or more values from the first data set. For example, and referring additionally to FIG. 4B, differences 412 (e.g., between the first data set and the second data set, as described above) may be provided to a model-fitting algorithm 416 that is configured to adjust the variable coefficients such that model 402 (e.g., Eq. (8)) approximates one or more values from the first data set (e.g., such that differences between the expected and indicated values are minimized). In these and similar embodiments, values indicative of the baseline coefficients (e.g., Eq. (7)) may be included in the second data set, and values indicative of the variable coefficients (e.g., Eq. (8)) may be included in the first data set.

Figure 5A:
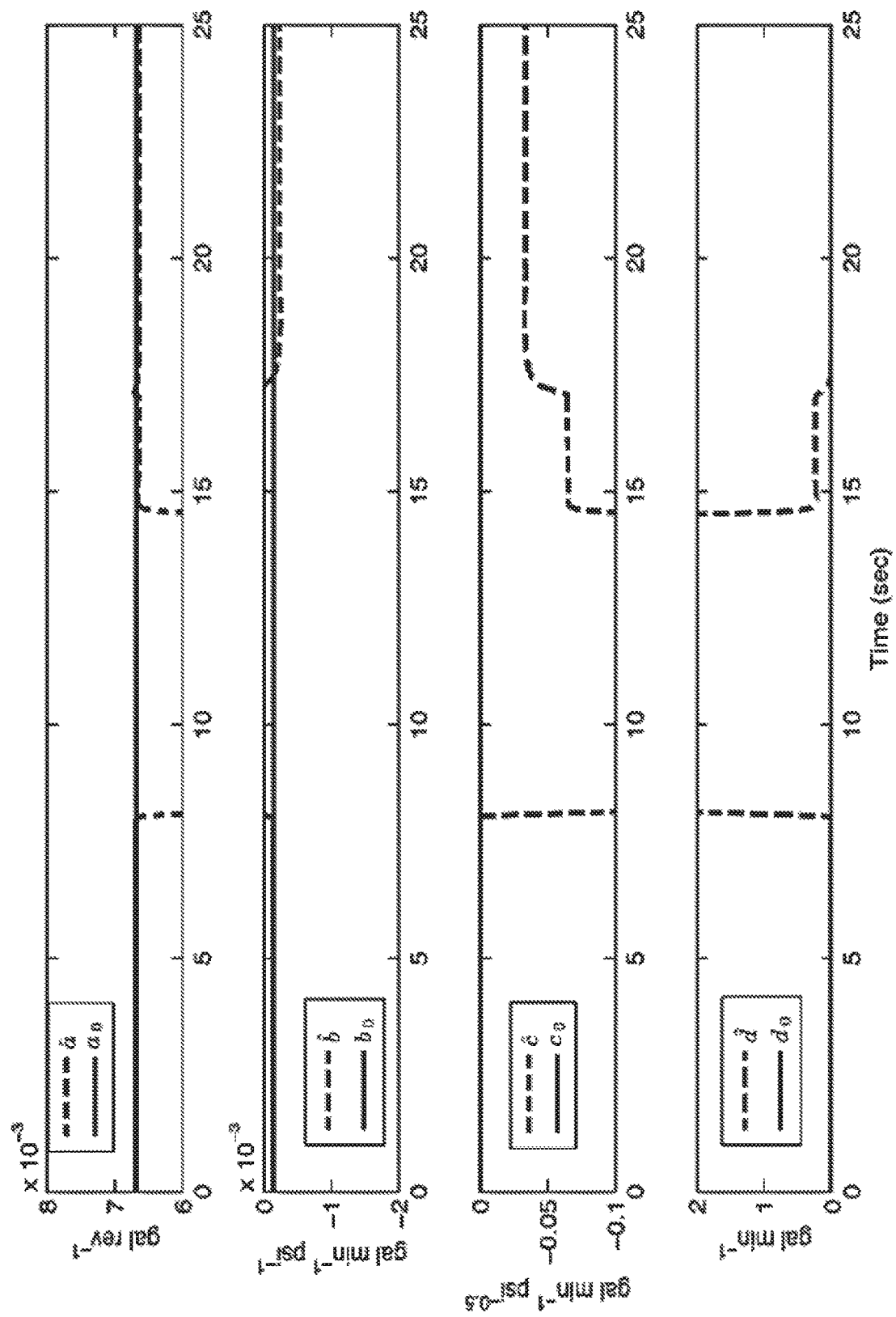
FIGS. 5A-5D are graphs illustrating one or more examples of node-based fault detection and/or identification.
Figure 5B:
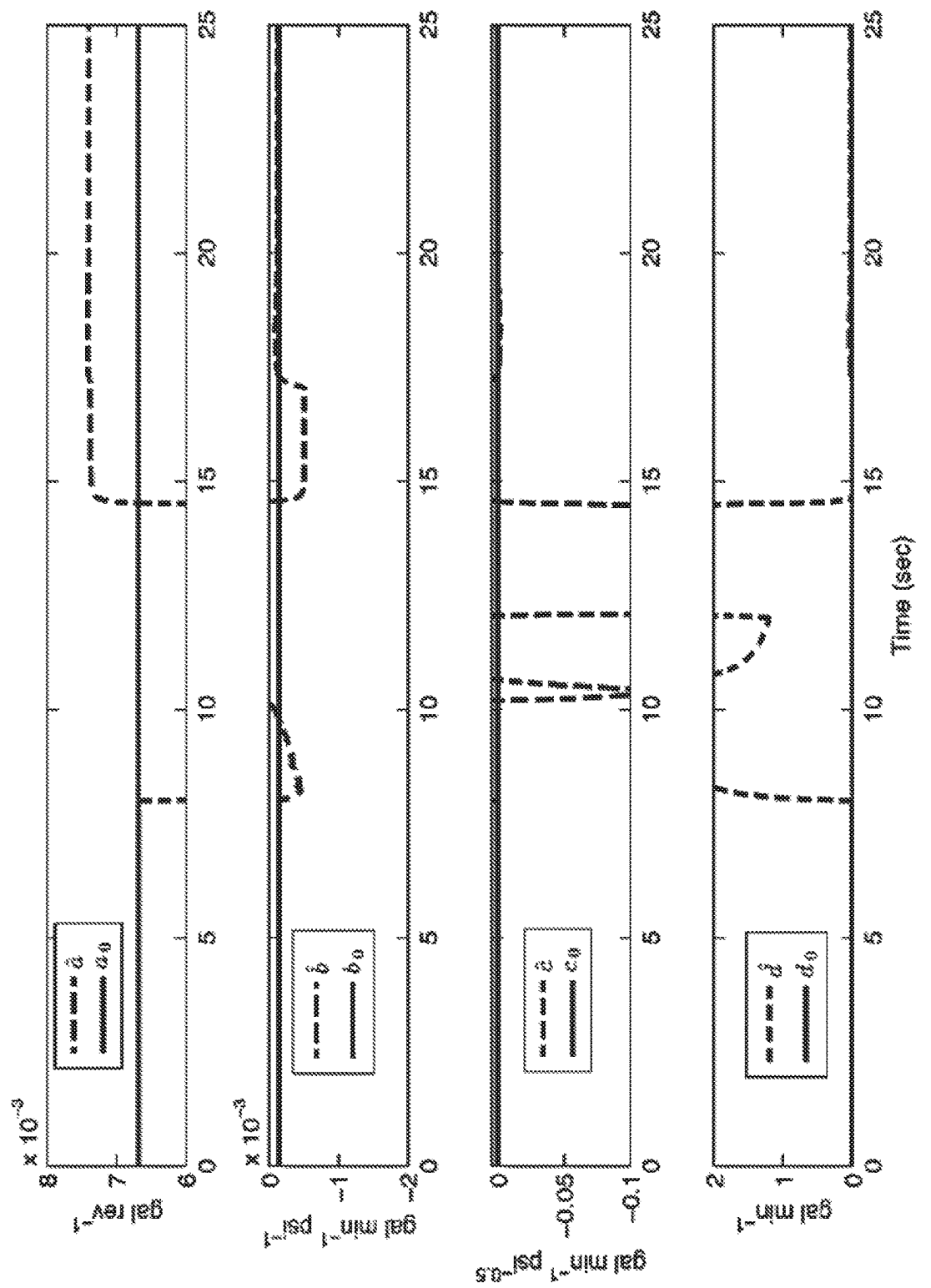

Changes in such variable coefficients may be analyzed or compared to baseline coefficients (step 228) and used to indicate whether a node and/or component fault has occurred, as well as isolate and/or identify the fault (step 232). For example, and referring additionally to FIGS. 5A-5D, shown are graphs of $a_0$, $b_0$, $c_0$, and $d_0$, which may correspond to a modelled piston pump (e.g., baseline coefficients), and $\hat{a}$, $\hat{b}$, $\hat{c}$, and $\hat{d}$, which may correspond to actuation of axial piston pump 300 (e.g., variable coefficients). As shown, the variable coefficients may each be associated with one or more fault types. For example, FIG. 5A depicts the variable coefficients versus time for axial piston pump 300 having an external leakage fault (e.g., with $\hat{c}$ having the greatest continuous variance from its respective baseline coefficient, as shown). FIG. 5B depicts the variable coefficients versus time for one of one or more sensors 38

Figure 5C:
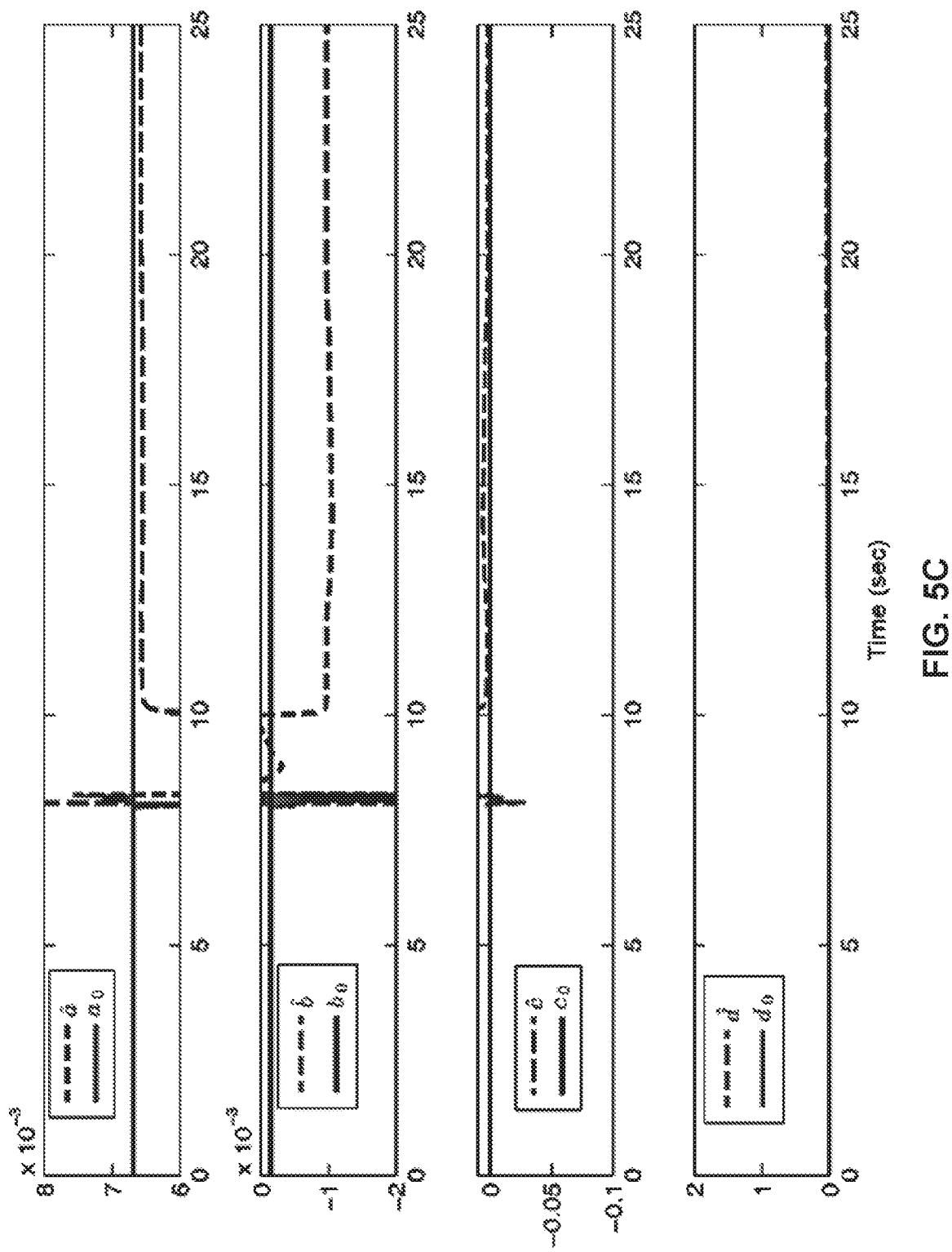
Figure 5D:
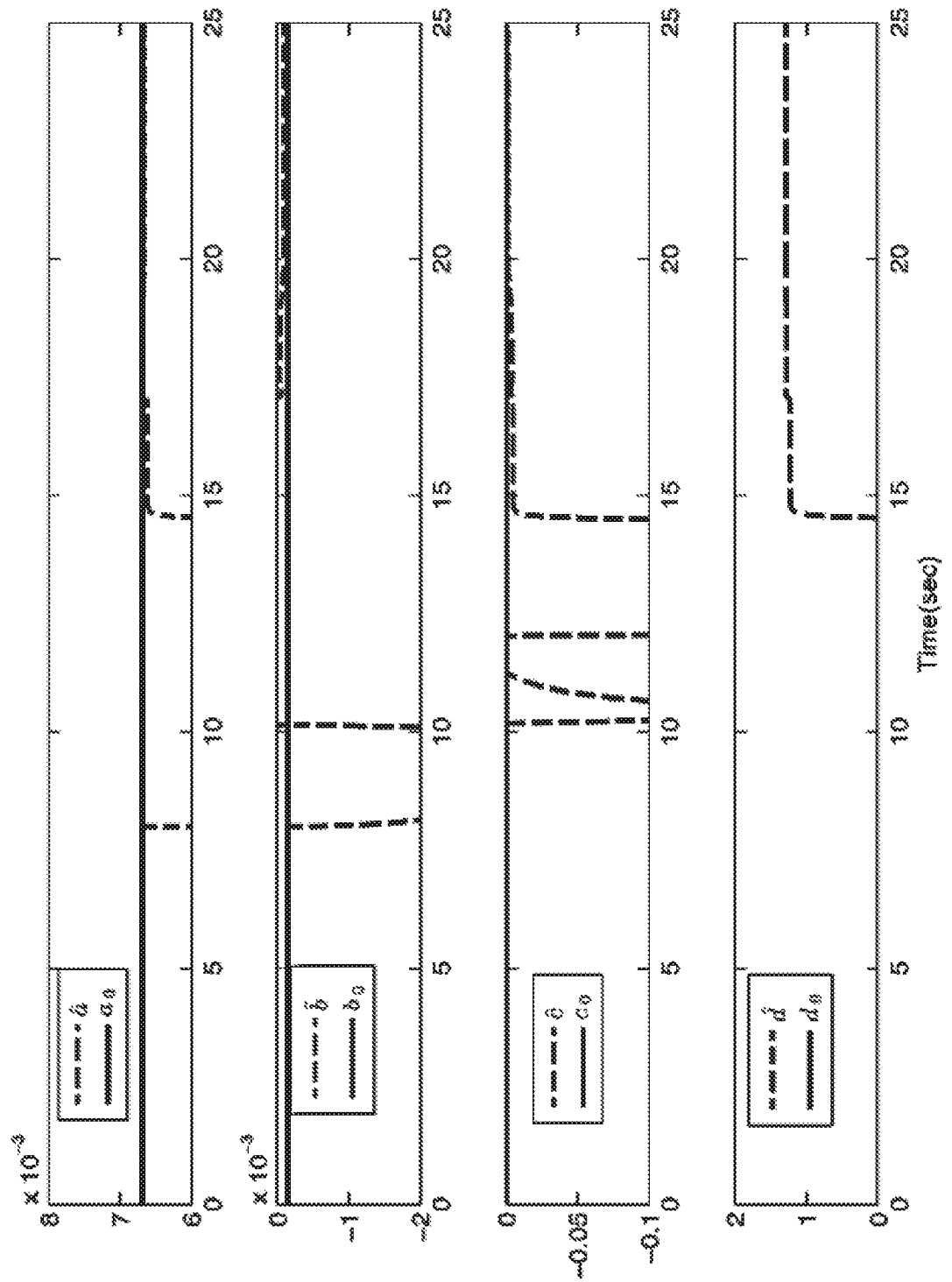
Figure 6:
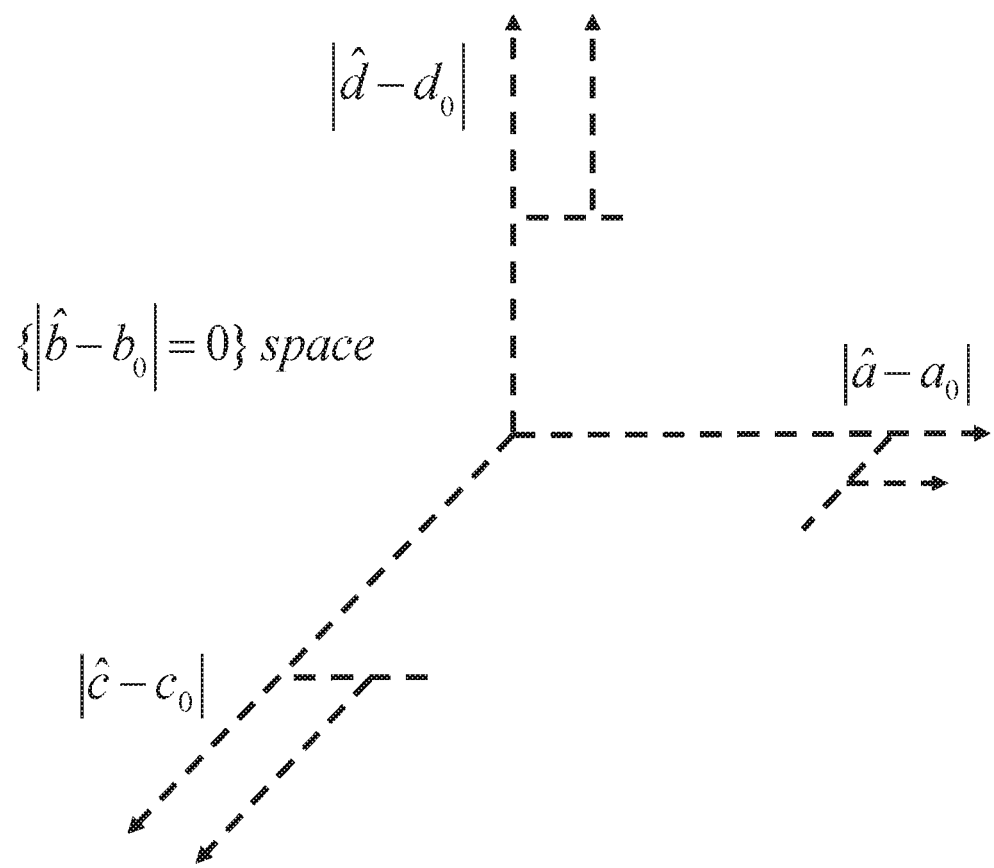
FIG. 6 is a graphical representation of one or more examples of node-based fault detection and/or identification.

(e.g., a pump speed sensor) having a gain fault (e.g., with $\hat{a}$ having the greatest continuous variance from its respective baseline coefficient, as shown). FIG. 5C depicts the variable coefficients versus time for axial piston pump 300 having an internal leakage fault (e.g., with $\hat{b}$ having the greatest continuous variance from its respective baseline coefficient, as shown). FIG. 5D depicts the variable coefficients versus time for one of one or more sensors 38 (e.g., a pump speed sensor) having an off-set bias fault (e.g., with $\hat{d}$ having the greatest continuous variance from its respective baseline coefficient, as shown). Thus, in the example shown, at step 220, differences between the baseline coefficients and the variable coefficients may be used to identify a type of fault in a node and/or a component of the node. This may be visualized in FIG. 6, in which one or more faults may be identified when differences between baseline coefficients and respective variable coefficients exceed a threshold.

For further example, and referring back to FIG. 1, in the embodiment shown, node 22b may receive a command from system controller 14 to close one or more valves of manifold 34b of the node, and one or more sensors 38 of the node may capture a first data set corresponding to closing of the one or more valves, such as hydraulic fluid pressures and/or flow rates within the manifold. In this embodiment, processor 30 of the node may compare the first data set to a second data set corresponding to a simulation or model of closing of the one or more valves of the manifold, such as expected hydraulic fluid pressure and/or flow rates within the manifold. Similarly, in this embodiment, node 22b may receive a command from system controller 14 to open one or more valves of manifold 34b of the node, and processor 30 of the node may compare a first data set corresponding to opening of the one or more valves with a second data set corresponding to a simulation or model of opening of the one or more valves (e.g., modelling and/or simulation may be command-specific).

In some embodiments, simulations or models may be refined based on historic one or more sensor 38 data (e.g., stored in a memory, such as, for example, memory 42, memory 46, and/or the like). At least through such distributed diagnostics capabilities, some embodiments of the present BOP control systems may be configured to maximize system availability (e.g., by monitoring for degradation of BOP system components, anticipating failure of the BOP system components, identifying faulty components, and/or the like), system reliability, and/or system fault tolerance.

Figure 7:
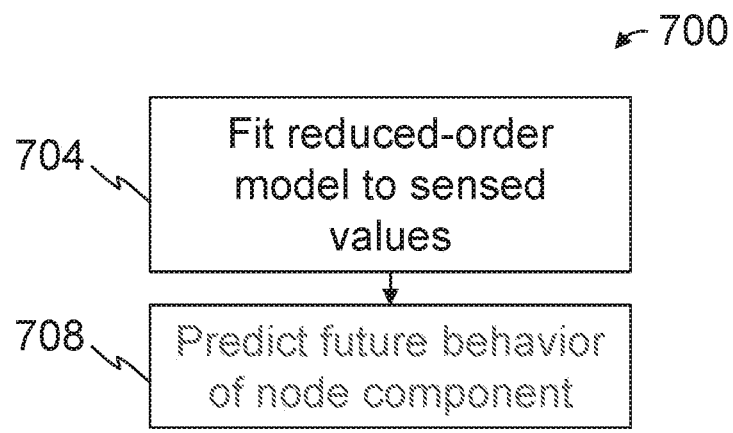
FIG. 7 is a flow chart of one example of node-based prognostics.
Figure 8:
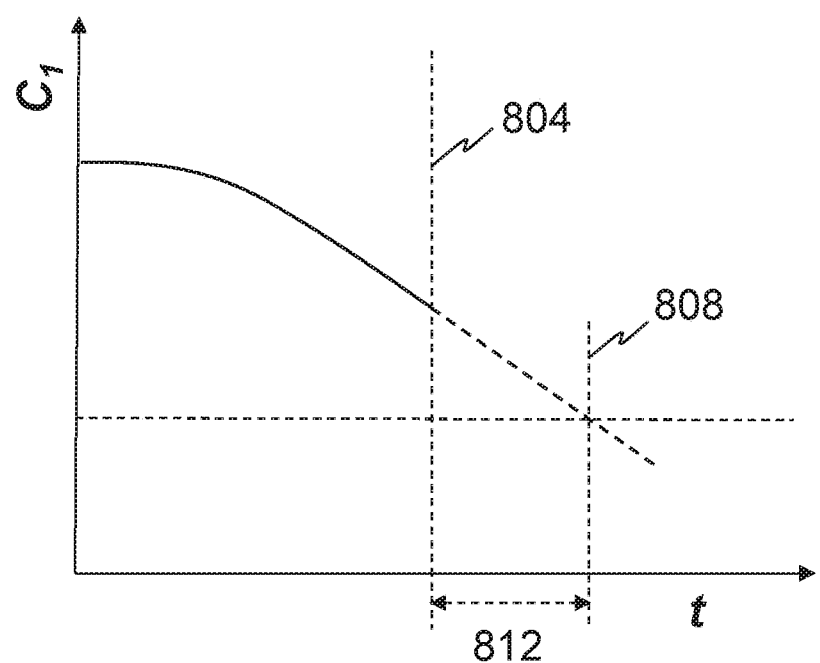
FIG. 8 is a graphical representation of one example of node-based prognostics.

In the embodiment shown, a processor 30 of each node (e.g., 22a, 22b, 22c, 22d, 22e, 22f) is configured to analyze a first data set to determine a useful life remaining (e.g., a prognostic parameter) of a component of the node. Referring now to FIG. 7, shown is a flow chart of one example 700 of such node-based prognostics. In the example shown, at step 704, one or more variable coefficients of a reduced-order model (e.g., Eq. (8)) may be adjusted such that the reduced-order model approximates the first data set (e.g., in a same or a similar fashion to as described for step 212, above). In this example, at step 708, future behavior of the component may be anticipated based, at least in part, on the adjusted reduced-order model. For example, and as shown in FIG. 8, one or more variable coefficients (e.g., $\hat{a}$, $\hat{b}$, $\hat{c}$, and/or $\hat{d}$) of the adjusted reduced-order model may be monitored over a period of time (e.g., up until an instant time 804). In this example, trends in the one or more variable coefficients may be extrapolated to approximate a failure time 808 (e.g., a time when at least one of the one or more variable coefficients is anticipated to fall above or below a threshold), and thus a useful life remaining 812 of the component. In this embodiment, processor 30 of the node may be configured to communicate the useful life remaining of the component of the node to system controller 14, which in turn, may be configured to communicate the useful life remaining of the component to a user (e.g., via a human-machine interface).

For further example, a processor 30 of the node may compare a value in the first data set, such as a number of actuations of the component of the node, to another value, such as a maximum number of actuations of the component, to determine a useful life remaining of the component.

In this embodiment, each node, and more particularly, a processor 30 of each node, may be configured to communicate node and/or component faults to system controller 14. For example, in the depicted embodiment, a processor 30 of each node is configured to communicate a fault to system controller 14 if the useful life remaining (e.g., 812) of a component of the node is below a threshold. For further example, in the embodiment shown, a processor 30 of each node is configured to analyze the first data set to identify an abnormal actuation of a component of the node and communicate a fault to system controller 14 if an abnormal actuation of the component is identified (e.g., if at least one of one or more sensors 38 of the node indicates that the component failed to fully actuate, the component had a response time that exceeds a threshold, and/or the like). Such abnormal actuations may also be identified by non- and/or partial-responsiveness of a node and/or a processor 30 of the node (e.g., when the node and/or processor are experiencing communications faults). For yet further example, a processor 30 of each node may communicate a fault to system controller 14 if differences between the first data set and the second data set (e.g., as described above) exceed a threshold. Such faults may indicate that a node and/or a component of the node has failed, may fail, and/or the like. In this embodiment, system controller 14 may be configured to communicate node faults to a user (e.g., via a human-machine interface). In the embodiment shown, at least one of the nodes is configured to communicate with at least one controller outside of BOP control system 10a (e.g., in the event that system controller 14 is unavailable, for example, after an emergency disconnect sequence).

For example, some embodiments of the present methods for actuating a BOP function (e.g., 18a) comprise selecting a first functional pathway (e.g., 26a) from two or more available functional pathways (e.g., 26a, 26b, and 26c) associated with the first BOP function, communicating one or more commands to an actuatable component of each of one or more nodes (e.g., component 34a of node 22a and component 34b of node 22b) of the first functional pathway to actuate the component, where actuation of the component of each of the one or more nodes of the first functional pathway actuates the first BOP function, and receiving, from at least one of the one or more nodes of the first functional pathway, information associated with actuation of the component.

In some embodiments, the received information includes a useful life remaining of the component. In some embodiments, the received information indicates a fault if the useful life remaining of the component is below a threshold. In some embodiments, the received information includes an identification of abnormal actuation of the component. In some embodiments, the received information indicates a fault if an abnormal actuation of the component is identified. In some embodiments, the received information includes differences between a first data set corresponding to actuation of the component and a second data set corresponding to a simulation of actuation of the component. In some embodiments, the received information indicates a fault if differences between the first data set and the second data set exceed a threshold.

In some embodiments, a processor (e.g., 30), one or more sensors (e.g., 38), a memory (e.g., 42), and/or the like may be retrofitted onto an actuatable component to create a node. In some embodiments, one or more nodes may each correspond to a lowest replaceable unit ("LRU") (e.g., the one or more nodes may be configured to be replaced rather than repaired.). In some embodiments, a node may be tested for faults (e.g., for proper functioning of a processor 30, one or more sensors 38, memory 42, actuatable component, and/or the like) before implementation in a BOP control system (e.g., 10a). Such testing may be performed offshore and/or onshore using an automated (e.g., hydroelectric) test unit configured to functionally test the processor, one or more sensors, memory, component and/or the like of the node and communicate results of the functional test, for example, to a service provider. In some embodiments, if the functional test indicates one or more faults in a node, the node may be rendered inoperable (e.g., by the node itself, the automated test unit, and/or the service provider) until the fault(s) of the node are addressed (e.g., and the node has been reset by the node itself, the automated test unit, and/or the service provider).

System controller 14, in response to one or more faults of one or more nodes of a functional pathway associated with a BOP function, may be configured to advise and/or alert an operator (e.g., at a human-machine interface), propose alternate functional pathways and/or BOP functions, and/or automatically select alternate functional pathways and/or BOP functions (e.g., based, at least in part, on a risk level assigned to the BOP function, as described below). For example, in the embodiment shown, system controller 14 is configured to remove a functional pathway from two or more available functional pathways associated with a BOP function if one or more nodes of the functional pathway communicate a fault to the system controller or has a risk level assignment that is above a threshold, is relatively high, and/or the like (discussed below). For example, in this embodiment, if node 22a or node 22b of functional pathway 26a communicates a fault to system controller 14, functional pathway 26a may be removed from the functional pathways associated with first BOP function 18a (e.g., leaving functional pathways 26b and 26c in the available functional pathways). In the embodiment shown, if one or more nodes of a first functional pathway (e.g., nodes 22a and 22b of functional pathway 26a) associated with a BOP function (e.g., 18a) communicates a fault to system controller 14, the system controller may be configured to actuate the first BOP function by communicating one or more commands to one or more nodes of a second functional pathway (e.g., nodes 22c and 22d of functional pathway 26b or nodes 22e and 22f of functional pathway 26c).

For example, some embodiments of the present methods comprise selecting a second functional pathway (e.g., 26b) from two or more available functional pathways associated with a first BOP function (e.g., 18a) if information received from at least one of one or more nodes of a first functional pathway associated with the first BOP function (e.g., nodes 22a and/or 22b of functional pathway 26a) indicates a fault. Some embodiments comprise removing the first functional pathway from the two or more available functional pathways if the received information indicates a fault.

In the depicted embodiment, system controller 14 is configured to remove a functional pathway (e.g., 26d) from one or more available functional pathways (e.g., 26d, 26e, and 26f) associated with a second BOP function (e.g., 18b) if the functional pathway associated with The second BOP function includes one or more nodes of a first functional pathway (e.g., node 22a of functional pathway 26a) associated with a first BOP function (e.g., 18a) that communicates a fault to system controller 14.

For example, some embodiments of the present methods comprise removing a second functional pathway (e.g., 26d) from two or more available functional pathways (e.g., 26d, 26e, and 26f) associated with a second BOP function (e.g., 18b) if the received information indicates a fault of a node common to the first functional pathway and the second functional pathway (e.g., node 22a is common to functional pathway 26a associated with first BOP function 18a and functional pathway 26d associated with second BOP function 18b).

In the embodiment shown, system controller 14 is configured to assign a risk level (e.g., a failure risk level) to one or more BOP functions (e.g., 18a and/or 18b), to one or more functional pathways (e.g., 26a, 26b, 26c, 26d, 26e, and/or 26f) associated with the BOP function(s), and/or to one or more nodes (e.g., 22a, 22b, 22c, 22d, 22e, and/or 22f) associated with the functional pathway(s). A risk level of a BOP function may be assigned based upon a risk level assigned to one or more functional pathways and/or one or more nodes associated with the BOP function. A risk level of a functional pathway may be assigned based upon a risk level assigned to one or more nodes associated with the functional pathway. In some embodiments, a functional pathway for actuating a BOP function may be selected by choosing the functional pathway that is assigned the lowest risk level. In some embodiments, a node having a risk level at or above a threshold risk level may be considered faulty.

Assignment of a risk level to a BOP function, a functional pathway, and/or a node can be based upon one or more factors. Such factor(s) may include, for example, sensed value(s), value(s) associated with the importance of the BOP function, functional pathway, and/or node to safe drilling or production operations (e.g., considering the magnitude of potential loss in the event of a failure of the BOP function, functional pathway, and/or node), a level of confidence in the factor(s) (e.g., a time elapsed since sensed value(s) were last acquired), and/or the like, and some factor(s) may be given more weight than other(s) of the factor(s). Such a risk level assignment may be facilitated using known risk assessment techniques, such as, for example, probabilistic risk assessment, a failure mode and effects analysis, a fault tree analysis, a hazard analysis, and/or the like.

For example, in this embodiment, a risk level may be assigned to a BOP function, a functional pathway, and/or a node based, at least in part, on a number of available functional pathways for actuating the BOP function (e.g., where less available functional pathways for actuating the BOP function corresponds to a higher risk level assigned to the BOP function). For further example, in the depicted embodiment, a risk level may be assigned to a BOP function, a functional pathway, and/or a node based, at least in part, on a harm associated with a failure to actuate the BOP function (e.g., failure to actuate a close function on a shear-type BOP may result in a well blowout, and thus such a function may be assigned elevated risk levels relative to less safety-critical BOP functions). For yet further example, in the embodiment shown, a risk level may be assigned to a BOP function, a functional pathway, and/or a node based, at least in part, on a type of fault communicated by one or more nodes of a functional pathway associated with the BOP function (e.g., a node communicating a slowed response time, but otherwise operating at an acceptable capacity, may result in a lower risk level assignment than a node communicating operations at a reduced capacity, a node communicating the potential for an imminent failure may result in a higher risk level assignment than a node communicating the potential for a less-imminent failure). For yet further example, in this embodiment, a risk level may be assigned to a BOP function, a functional pathway, and/or a node based, at least in part, on a number of redundant BOP functions available for accomplishing a same or a similar outcome as the BOP function (e.g., where less available redundant BOP functions corresponds to a higher risk level assigned to the BOP function). For yet further example, in the depicted embodiment, a risk level may be assigned to a BOP function, a functional pathway, and/or a node based, at least in part, on a designation of the BOP function, the functional pathway, and/or the node as an emergency (e.g., last resort) option. For yet further example, in the embodiment shown, a risk level may be assigned to a BOP function, a functional pathway, and/or a node based, at least in part, on a useful life remaining of one or more nodes (e.g., actuatable component(s) thereof). For yet further example, in this embodiment, a risk level may be assigned to a BOP function, a functional pathway, and/or a node based, at least in part, on a time elapsed since the most recent actuation (e.g., actual use or performance or function test) of one or more nodes (e.g., actuatable component(s) thereof). Such a time-based risk level may be reset or reduced upon actuation of the node(s) (e.g., which may be pursuant to a predetermined schedule).

In the embodiment shown, at least one of the one or more nodes (e.g., 22b) comprises a memory 42. In this embodiment, memory 42 may be configured to store at least a portion of the first data set and/or the second data set. In the depicted embodiment, system 10a comprises a memory 46 in communication with each of one or more nodes of a functional pathway (e.g., in some embodiments, with each of one or more nodes of each functional pathway). In these and similar embodiments, a data recording and health monitoring subsystem may be implemented to collect data captured by one or more sensors 38, store at least a portion of the captured data in memory 46, and/or provide the captured data to system controller 14.

In this embodiment, system 10a is configured to be process-aware. For example, system 10a, and more particularly, system controller 14, may be aware of BOP functions selected for actuation during a given process. To illustrate, if system 10a is implemented during a drilling process, system controller 14 may be aware that a first BOP function (e.g., 18a) has been selected for actuation (e.g., a first BOP function to close a first shear-type BOP). In the embodiment shown, system controller 14 may be configured to alert and/or advise a user and/or select a second BOP function (e.g., 18b) for actuation (e.g., a second BOP function to close a second shear-type BOP) if one or more nodes (e.g., 26a, 26b, 26c, 26d, 26e, and/or 26f) of a functional pathway (e.g., 26a, 26b, and 26) associated with the first BOP function communicates a fault to the system controller. For example, some embodiments of the present methods comprise selecting a second BOP function (e.g., 18b), if information received from at least one of one or more nodes (e.g., 26a, 26b, 26c, 26d, 26e, and/or 26f) of a functional pathway (e.g., 26a, 26b, and 26c) associated with the first BOP function indicates a fault.

Figure 9:
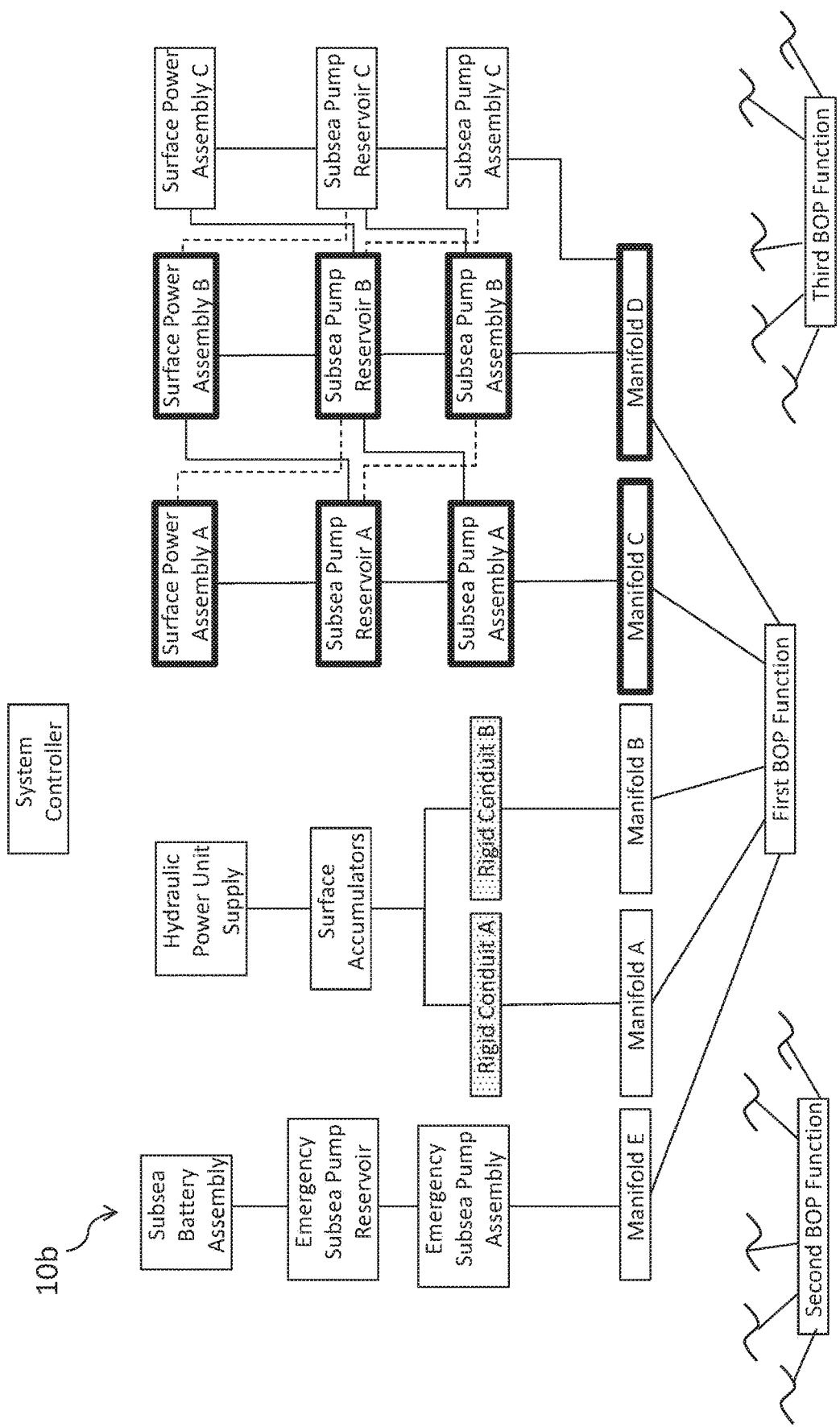
FIG. 9 is a diagram of a second embodiment of the present BOP control systems.

Referring now to FIG. 9, shown therein and designated by the reference numeral 10b is a second embodiment of the present BOP control systems. System 10b may be substantially similar to system 10a, with the primary exceptions described below. In FIG. 9, dashed lines and solid lines each represent functional pathway(s) or portion(s) thereof, and the dashed lines are only dashed for readability. As shown, system 10b includes at least 18 functional pathways for actuating a first BOP function. Also as shown, the same, similar, or other functional pathway(s) may be provided for actuating a second and/or third BOP function. In this embodiment, the first, second, and third BOP functions may be functions of an annular BOP and/or ram BOP.

Provided below, by way of illustration, is a list of functional pathways shown in FIG. 9 that include the nodes represented by boxes having thicker borders.

Surface Power Assembly A—Subsea Reservoir A—Subsea Pump Assembly A—Manifold C—First BOP function;
Surface Power Assembly A—Subsea Reservoir B—Subsea Pump Assembly A—Manifold C—First BOP function;
Surface Power Assembly A—Subsea Reservoir A—Subsea Pump Assembly B—Manifold D—First BOP function;
Surface Power Assembly A—Subsea Reservoir B—Subsea Pump Assembly B—Manifold D—First BOP function;
Surface Power Assembly B—Subsea Reservoir B—Subsea Pump Assembly B—Manifold D—First BOP function;
Surface Power Assembly B—Subsea Reservoir B—Subsea Pump Assembly A—Manifold C—First BOP function;
Surface Power Assembly B—Subsea Reservoir A—Subsea Pump Assembly B—Manifold D—First BOP function; and
Surface Power Assembly B—Subsea Reservoir A—Subsea Pump Assembly A—Manifold C—First BOP function.

As shown, though rigid conduits A and B are components that must be operable in order to actuate a BOP function using certain functional pathway(s), rigid conduits A and B are not considered nodes.

If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media are physical computer storage media. A physical storage medium may be any available medium that can be accessed by a computer. By way of example, and not limitation, such non-transitory computer-readable media can comprise RAM, ROM, EPROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above are also be included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices, and/or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the systems and methods are not intended to be limited to the particular forms disclosed. Rather, they include all modifications and alternatives falling within the scope of the claims, and embodiments other than the ones shown may include some or all of the features of the depicted embodiments. For example, elements may be omitted or combined as a unitary structure and/or connections may be substituted. Further, where appropriate, aspects of any one of the examples described above may be combined with aspects of any other one(s) of the examples described above to form further examples having comparable or different properties and/or functions and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

REFERENCES

These references, to the extent that they provide details related to those set forth herein, are specifically incorporated by reference.

[1] Radovan Petrović, *Mathematical Modeling and Experimental Research of Characteristic Parameters Hydrodynamic Processes of a Piston Axial Pump*, 55(2009)4 J. of Mech. Eng'g 224 (2009).

The invention claimed is:

1. A blowout preventer (BOP) control system comprising:
    a system controller configured to actuate a first BOP function by communicating one or more commands to a plurality of nodes of a functional pathway selected from at least two functional pathways associated with the first BOP function;
    each of the plurality of nodes comprising an actuatable component configured to actuate in response to a command received from the system controller, each of the plurality of nodes having:
        one or more sensors configured to capture data indicative of a first data set corresponding to actuation of the respective component; and
        a processor of each node configured to:
            analyze the first data set to determine a useful life remaining of the respective component; and
            communicate the useful life remaining of the respective component to the system controller.

2. The control system of claim 1, wherein the processor of each of the plurality of nodes is configured to communicate a fault to the system controller if the useful life remaining of the respective component of the node is below a threshold.

3. The control system of claim 1, wherein the system controller is configured to assign a risk level to the first BOP function.

4. The control system of claim 3, wherein the risk level is assigned based, at least in part, on a number of available functional pathways for actuating the first BOP function.

5. The control system of claim 3, wherein the risk level is assigned based, at least in part, on a harm associated with a failure to actuate the first BOP function.

6. The control system of claim 3, wherein the risk level is assigned based, at least in part, on a type of fault communicated by one or more of the plurality nodes of a functional pathway.

7. The control system of claim 1, wherein the processor of each of the plurality of nodes is configured to:
    compare the first data set to a second data set that corresponds to a simulation of actuation of the respective component of the node to determine one or more differences between the first data set and the second data set; and
    communicate a fault to the system controller if at least one of the one or more differences exceeds a threshold.

8. The control system of claim 1, wherein the respective component of at least one of the plurality of nodes of at least one of the at least two functional pathways includes:
    a hydraulic manifold including one or more actuatable valves; or
    a hydraulic pump.

9. The control system of claim 1, wherein the first data set includes data indicative of a number of times that the respective component has been actuated.

10. The control system of claim 1, wherein the first data set includes data indicative of a response time of the respective component.

11. The control system of claim 1, wherein the processor of each of the plurality of nodes is configured to:
    analyze the first data set to identify an abnormal actuation of the respective component; and
    communicate a fault to the system controller if an abnormal actuation of the respective component is identified.

12. The control system of claim 1, wherein the processor of each of the plurality of nodes is configured to:
    analyze the first data set to useful life remaining of the actuable component; and
    communicate the useful life remaining to the system controller.

13. The control system of claim 12, wherein the system controller is configured to communicate the useful life remaining of the respective actuable component of each node to a user.

14. The control system of claim 1, wherein the system controller is configured to select a second BOP function if one or more of the plurality of nodes of the first functional pathway associated with the first BOP function communicates a fault to the system controller.

15. The control system of claim 1, wherein the system controller is configured to scan the BOP control system for available functional pathways for actuating the first BOP function.

16. The control system of claim 1, wherein the system controller is configured to communicate to a user a number of available functional pathways for actuating the first BOP function.

17. The control system of claim 1, further comprising a memory in communication with each of the plurality of nodes of a functional pathway.

18. The control system of claim 1, wherein at least one of the plurality of nodes includes a memory configured to store at least a portion of the first data set.

19. The control system of claim 1, wherein at least one of the plurality of nodes includes a virtual sensor.

20. The control system of claim 1, wherein the system controller is configured to periodically actuate the first BOP function to maximize system availability.

21. A blowout preventer (BOP) control system comprising:
a system controller configured to actuate a first BOP function by communicating one or more commands to a plurality of nodes of a functional pathway selected from one or more functional pathways associated with the first BOP function;
each of the plurality of nodes including an actuatable component configured to actuate in response to a command received from the system controller, each of the plurality of nodes having:
one or more sensors configured to capture data indicative of a first data set corresponding to actuation of the respective component; and
a processor of each node configured to:
compare the first data set to a second data set that corresponds to a simulation of actuation of the respective component to determine one or more differences between the first data set and the second data set; and
communicate to the system controller.

22. The control system of claim 21, wherein the processor of each of the plurality of nodes is configured to compare the first data set to the second data set, at least in part, by adjusting one or more coefficients of a model of the respective component of the node such that the adjusted model approximates one or more sensed values from the first data set.

23. The control system of claim 21, wherein the processor of each of the plurality of nodes is configured to compare the first data set to the second data set, at least in part, by:
inputting at least a first sensed value from the first data set into a model of the respective component of the node to determine one or more expected values of the second data set; and
comparing at least a second sensed value from the first data set with at least one of the one or more expected values.

24. The control system of claim 21, wherein the processor of each of the plurality of nodes is configured to:
analyze the first data set to identify an abnormal actuation of the respective component; and
communicate a fault to the system controller if an abnormal actuation of the respective component is identified.

25. The control system of claim 21, wherein the system controller is configured to remove a first functional pathway from the one or more functional pathways if one or more of the plurality of nodes of the fist functional pathway communicates a fault to the system controller.

26. The system of claim 21, wherein the system controller is configured to remove a second functional pathway from the one or more functional pathways associated with a second BOP function if the second pathway includes one or more nodes of the first functional pathway that communicates a fault to the system controller.

27. The control system of claim 21, wherein:
the one or more functional pathways comprises a first functional pathway and second functional pathway; and
the system controller is configured to actuate the first BOP function by communicating one or more commands to one or more nodes of the second functional pathway if one or more of the plurality of nodes of the first functional pathway communicates a fault to the system controller.

28. The control system of claim 21, wherein the system controller is configured to periodically actuate the first BOP function.

* * * * *